United States Patent
Army et al.

(10) Patent No.: US 11,090,592 B2
(45) Date of Patent: Aug. 17, 2021

(54) HIGH PRESSURE WATER COLLECTOR WITH RADIAL DIFFUSER

(71) Applicant: HAMILTON SUNDSTRAND CORPORATION, Charlotte, NC (US)

(72) Inventors: Donald E. Army, Enfield, CT (US); Christopher McAuliffe, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 449 days.

(21) Appl. No.: 16/015,951

(22) Filed: Jun. 22, 2018

(65) Prior Publication Data

US 2019/0388817 A1      Dec. 26, 2019

(51) Int. Cl.
*B01D 45/16* (2006.01)
*B01D 45/06* (2006.01)
*B04C 3/06* (2006.01)

(52) U.S. Cl.
CPC ............ *B01D 45/16* (2013.01); *B01D 45/06* (2013.01); *B04C 3/06* (2013.01)

(58) Field of Classification Search
CPC ........ B01D 45/16; B01D 45/12; B01D 45/06; B04C 3/06
See application file for complete search history.

(56) References Cited

U.S. PATENT DOCUMENTS

| | | | | |
|---|---|---|---|---|
| 4,180,391 A | * | 12/1979 | Perry, Jr. ................. | B01D 45/16 55/324 |
| 4,516,994 A | * | 5/1985 | Kocher .................. | B01D 45/12 210/304 |
| 4,681,610 A | * | 7/1987 | Warner .................. | B01D 45/16 55/338 |
| 7,266,958 B2 | * | 9/2007 | Milde .................... | B01D 45/16 55/319 |
| 2002/0194988 A1 | * | 12/2002 | Betting .................. | B01D 45/16 95/29 |
| 2008/0271421 A1 | * | 11/2008 | Darke .................... | B01D 45/16 55/396 |
| 2011/0296987 A1 | | 12/2011 | Buhrman et al. | |
| 2016/0096129 A1 | * | 4/2016 | Kochubei .............. | F01M 11/08 95/269 |
| 2018/0119704 A1 | * | 5/2018 | Sano ..................... | F04D 29/083 |
| 2018/0361289 A1 | * | 12/2018 | Suzuki ..................... | B04C 3/02 |

FOREIGN PATENT DOCUMENTS

| DE | 10230881 A1 | 2/2004 |
|---|---|---|
| GB | 1206007 A | 9/1970 |

OTHER PUBLICATIONS

European Search Report for European Application No. 19180494.7 dated Feb. 12, 2020, 8 pages.

* cited by examiner

*Primary Examiner* — Robert Clemente
(74) *Attorney, Agent, or Firm* — Cantor Colburn LLP

(57) ABSTRACT

A water collector assembly includes a diffuser assembly having a diffuser body. The diffuser body extends between an inlet duct and an outlet duct along a first axis. The diffuser body includes a first end wall extending from a second inlet duct end towards a first inlet duct end, a second end wall extending from a first outlet duct end towards a first inlet duct end, and a side wall extending between the first end wall and the second end wall.

12 Claims, 2 Drawing Sheets

HIGH PRESSURE WATER COLLECTOR WITH RADIAL DIFFUSER

BACKGROUND

A water collector may be provided with an environmental control system to capture or remove free moisture from an airflow. The water collector may include a separation device that directs the moisture present within the airflow to outer walls of the separation device and direct the free moisture towards a drain port. Often times the water collector may be substantially bulky and consume large amounts of package space.

SUMMARY

Disclosed is a water collector assembly that is provided with an environmental control system. The water collector assembly includes an inlet duct, an outlet duct and a diffuser assembly. The inlet duct extends between a first inlet duct end and a second inlet duct end along a first axis. The outlet duct extends between a first outlet duct end and a second outlet duct end along the first axis. The diffuser assembly includes a center body and a diffuser body. The center body extends between a first center body end and a second center body end along the first axis. The diffuser body is disposed about the center body such that an inlet is defined between the second inlet duct end and the first center body end and such that an ejector is defined proximate the second center body end. The diffuser body defines a first passageway, a second passageway, and a diffuser. The first passageway extends from the inlet towards the first inlet duct end. The second passageway extends from the ejector towards the inlet. The diffuser extends between the first passageway and the second passageway.

Also disclosed is a water collector assembly that is provided with an environmental control system. The water collector assembly includes a diffuser assembly. A diffuser body of the diffuser assembly extends between an inlet duct and an outlet duct along a first axis. The diffuser body includes a first end wall extending from a second inlet duct end towards a first inlet duct end, a second end wall extending from a first outlet duct end towards a first inlet duct end, and a side wall extending between the first end wall and the second end wall.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

Figure 1:
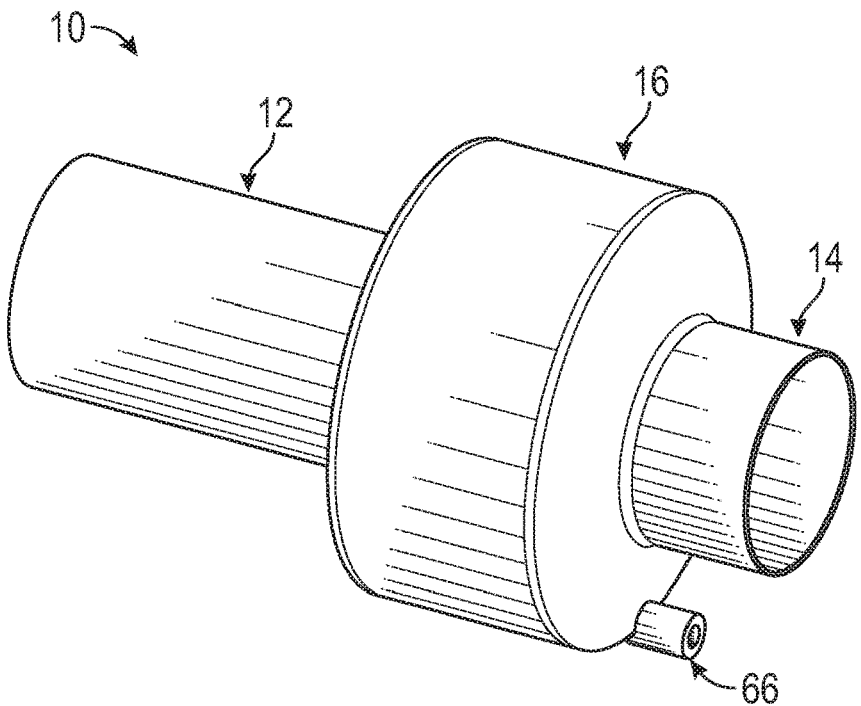
FIG. 1 is a perspective view of a water collector assembly.
Figure 2:
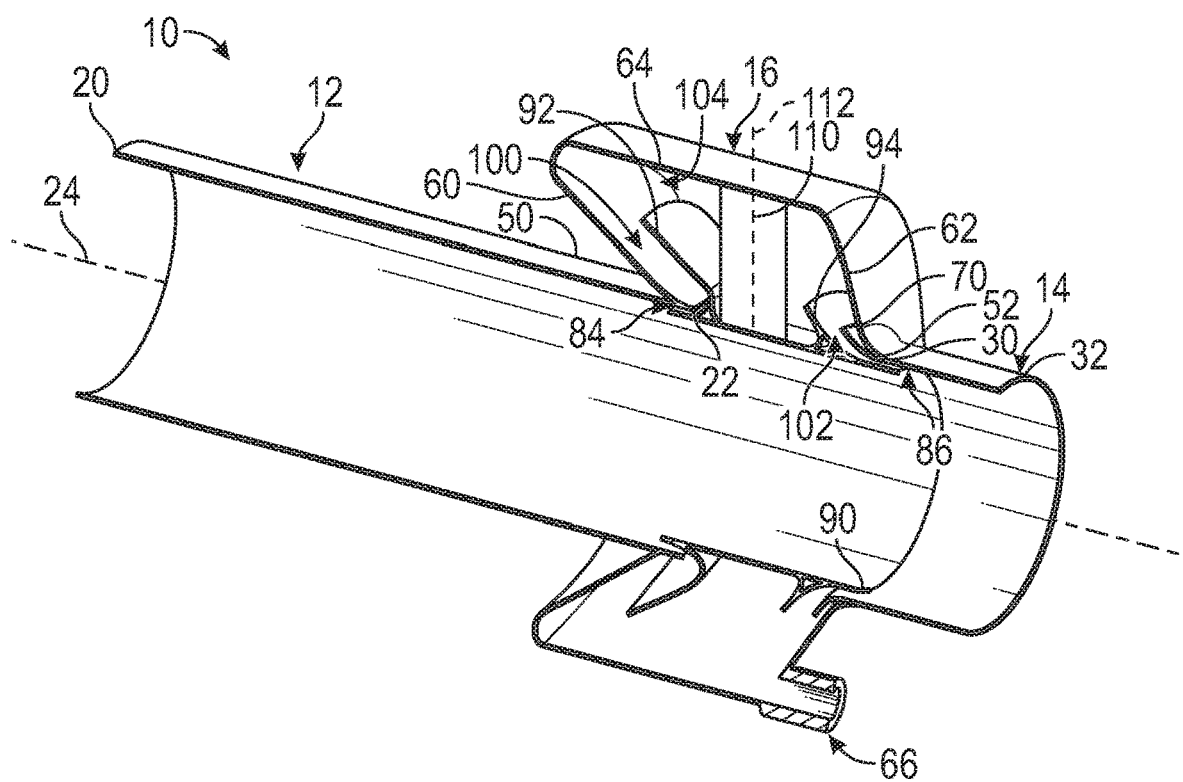
FIG. 2 is a partial sectional view of the water collector assembly.
Figure 3:
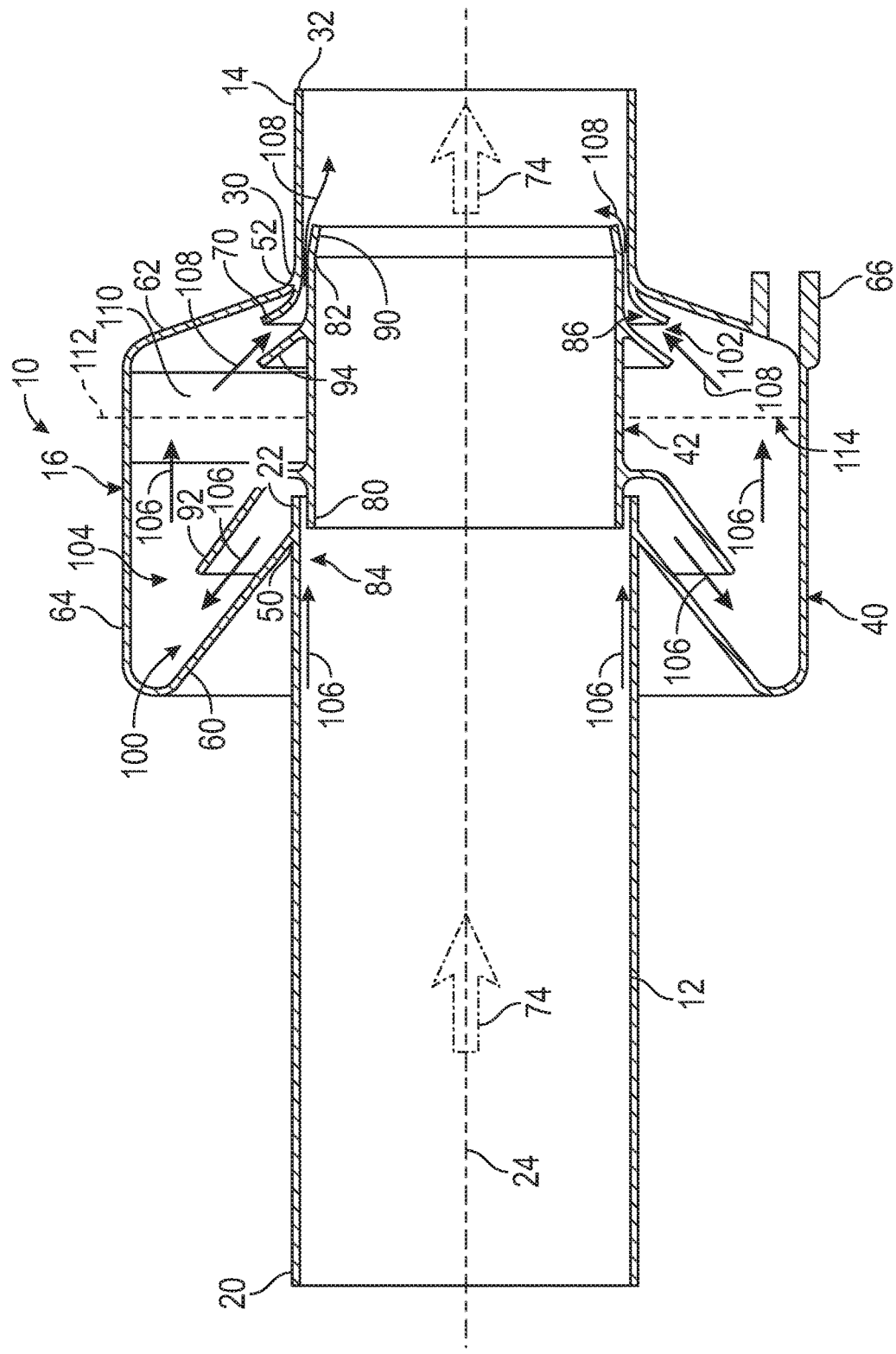
FIG. 3 is a sectional view of the water collector assembly.

Referring to FIGS. 1-3, a water collector assembly 10 is shown. The water collector assembly 10 includes an inlet duct 12, an outlet duct 14, and a diffuser assembly 16 disposed between the inlet duct 12 and the outlet duct 14. The water collector assembly 10 is arranged to receive an airflow through the inlet duct 12 and removes free moisture that may be present within the airflow via the diffuser assembly 16 and discharges the dried airflow through the outlet duct 14 towards a downstream component of an environmental control system or the like.

Referring to FIGS. 2 and 3, the inlet duct 12 extends between a first inlet duct end 20 and a second inlet duct end 22 along a first axis 24. The first axis 24 may be a central longitudinal axis about which the water collector assembly 10 may extend. A swirl vane or swirl generator may be disposed within the inlet duct 12 and may be disposed upstream of the diffuser assembly 16. The outlet duct 14 extends between a first outlet duct end 30 and a second outlet duct end 32 along the first axis 24. The diffuser assembly 16 is disposed between and is operatively connected to the inlet duct 12 and the outlet duct 14. In at least one embodiment, the diffuser assembly 16 is integrally formed with the inlet duct 12 and outlet duct 14.

The diffuser assembly 16 is arranged as a radial diffuser having an inverted conical inlet that enables a portion of the diffuser to be angled back towards the first inlet duct end 20 to allow for more efficient and simplified packaging of the water collector assembly 10. The diffuser assembly 16 includes a diffuser body 40 and a center body 42 disposed within the diffuser body 40.

The diffuser body 40 may be arranged as an inverted conical shell that is disposed about the center body 42 and portions of the inlet duct 12 and the outlet duct 14. The diffuser body 40 extends between the second inlet duct end 22 and the first outlet duct end 30 along the first axis 24. The diffuser body 40 extends between a first diffuser body end 50 and a second diffuser body end 52 along the first axis 24. The first diffuser body end 50 is operatively connected to the second inlet duct end 22. In at least one embodiment, the first diffuser body end 50 is at least partially defined by the second inlet duct end 22. The second diffuser body end 52 is operatively connected to the first outlet duct end 30. In at least one embodiment, the second diffuser body end 52 is at least partially defined by the first outlet duct end 30.

The diffuser body 40 includes a first end wall 60, a second end wall 62, and a side wall 64 that extends between the first end wall 60 and the second end wall 62. The first end wall 60 extends from proximate the second inlet duct end 22 towards the first inlet duct end 20 such that a first portion of the diffuser body 40 is arranged as an inverted conic. The second end wall 62 extends from proximate the first outlet duct end 30 towards the first inlet duct end 20, such that a second portion of the diffuser body 40 is angled towards the first portion of the diffuser body 40. The side wall 64 extends between distal ends of the first end wall 60 and the second end wall 62. A drain port 66 is at least partially defined by the side wall 64 and the second end wall 62, as shown in FIGS. 1-3.

The diffuser body 40 includes a gutter 70 that extends from at least one of the first outlet duct end 30 and/or the first diffuser body end 50 towards the first end wall 60. The gutter 70 may be disposed generally parallel to the second end wall 62.

The center body 42 is disposed within the diffuser body 40. The center body 42 may be spaced apart from the inlet duct 12 and the outlet duct 14. The center body 42 extends between a first center body end 80 and a second center body end 82 along the first axis 24. The center body 42 is a central opening that extends between the first center body end 80 and the second center body end 82 through which a main airflow 74 that is received through the inlet duct 12 may pass through the diffuser assembly 16 and into the outlet duct 14.

The first center body end 80 extends at least partially into or is at least partially received by the second inlet duct end 22 such that a fluid inlet 84 is defined between the second inlet duct end 22 and the first center body end 80. The second center body end 82 extends at least partially into or is at least partially received by the first outlet duct end 30 such that an ejector 86 is defined between the second center body end 82 and the first outlet duct end 30.

The center body 42 includes an extension 90, a first guide wall 92, and a second guide wall 94. The extension 90 may be provided with and may extend from the second center body end 82. The extension 90 extends towards the first axis 24. The extension 90 is disposed in a non-parallel and a non-perpendicular relationship with respect to the first center body end 80. A nozzle is defined between the extension 90 and an inner surface of the outlet duct 14.

The first guide wall 92 extends from proximate the first center body end 80 towards the first inlet duct end 20. The first guide wall 92 is disposed generally parallel to the first end wall 60.

The second guide wall 94 extends from proximate the second center body end 82 towards the first inlet duct end 20. The second guide wall 94 is disposed generally parallel to the second end wall 62 and/or the gutter 70.

The combination of the diffuser body 40 and the center body 42 define a first passageway 100, a second passageway 102, and a chamber 104.

The first passageway 100 is at least partially defined by the first end wall 60 and the first guide wall 92. The first passageway 100 extends from the fluid inlet 84 towards the chamber 104. The first passageway 100 may be arranged such that the diffuser body 40 of the diffuser assembly functions as a radial diffuser that decelerates and turns the airflow away from the flow direction of the main airflow 74 and towards the first end wall 60.

The second passageway 102 is at least partially defined by the second guide wall 94 and at least one of the gutter 70 and the second end wall 62. The second passageway 102 extends from the chamber 104 towards the ejector 86.

The fluid inlet 84 is sized to draw a small portion (e.g. moisture laden air 106) of the main flow 74 into chamber 104 and the ejector 86 is sized to eject dried airflow 108 back into the main airflow 74. The moisture laden air 106 is guided by the first passageway 100 towards the first end wall 60 and towards the chamber 104. The moisture laden air 106 is slowed within the settling chamber to enable the free moisture present in the moisture laden air 106 to drop to the bottom of chamber 104. The moisture collected in the chamber 104 is directed towards the drain port 66 by the walls of the diffuser assembly 16 and is exhausted through the drain port 66 towards heat exchangers or other systems, providing additional evaporative cooling. The dried airflow 108 is directed by the second passageway 102 through the ejector 86 and rejoins the main airflow 74.

A support member 110 extends between the diffuser body 40 and the center body 42 to operatively connect the center body 42 to the diffuser body 40 such that the center body 42 is radially supported by the diffuser body 40. The support member 110 extends along a second axis 112 that is disposed transverse to the first axis 24. The support member 110 is disposed between the first guide wall 92 and the second guide wall 94 such that the support member 110 is disposed within the chamber 104. In at least one embodiment, the support member 110 may be provided with at least one of the diffuser body 40 and the center body 42.

In at least one embodiment, a perforated member 114 may extend between the diffuser body 40 and the center body 42. The perforated member 114 may be circumferentially spaced apart from the support member 110. The perforated member 114 may be arranged to collect, trap, or otherwise receive moisture from the moisture laden air airflow 106 that may flow through diffuser assembly 16.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

What is claimed is:

1. A water collector assembly provided with an environmental control system, comprising:
    an inlet duct extending between a first inlet duct end and a second inlet duct end along a first axis; an outlet duct extending between a first outlet duct end and a second outlet duct end along the first axis; and
    a diffuser assembly, comprising:
    a center body extending between a first center body end and a second center body end along the first axis; and
    a diffuser body disposed about the center body such that; a fluid inlet is defined between the second inlet duct end and the first center body end; and an ejector is defined proximate the second center body end,
    the diffuser body defining: a first passageway extending from the fluid inlet towards the first inlet duct end, a second passageway extending from the ejector towards the fluid inlet, and a diffuser extending between the first passageway and the second passageway;
    wherein the second center body end is at least partially received within the first outlet duct end such that the ejector is defined between the second center body end and the first outlet duct end,
    wherein:
    the diffuser assembly is arranged as a radial diffuser defining an inverted conical inlet that enables a portion of the diffuser to be angled back towards the first inlet duct end;
    the diffuser body being arranged as an inverted conical shell that is disposed about the center body and portions of the inlet duct and the outlet duct; and
    a first end wall of the diffuser body extends from proximate the second inlet duct end towards the first inlet duct end such that a first portion of the diffuser body is arranged as an inverted conic; and
    wherein the first passageway is at least partially defined by the first end wall of the diffuser body and a first guide wall of the center body, the first guide wall being disposed generally parallel to the first end wall,
    whereby the first passageway is arranged such that the diffuser body of the diffuser assembly functions as the radial diffuser that decelerates and turns airflow away from the flow direction of a main airflow and towards the first end wall.

2. The water collector assembly of claim 1, wherein the diffuser body extends between first diffuser body end and a second diffuser body end along the first axis.

3. The water collector assembly of claim 2, wherein the first diffuser body end is at least partially defined by the second inlet duct end.

4. The water collector assembly of claim 2, wherein the center body includes a support member that extends towards the diffuser body along a second axis.

5. The water collector assembly of claim 4, wherein the second axis is disposed transverse to the first axis.

6. The water collector assembly of claim 1, wherein the first center body end is at least partially received within the second inlet duct end such that the fluid inlet is defined between the second inlet duct end and the first center body end.

7. The water collector assembly of claim 6, wherein the second passageway is at least partially defined by a second guide wall of the center body and gutter of the diffuser body diffuser body.

8. The water collector assembly of claim 7, wherein the second guide wall of the enter body and the gutter of the diffuser body each extend from the ejector towards the first center body end.

9. The water collector assembly of claim 1, wherein the gutter extends from at least one of the first outlet duct end and the second end wall and extends towards the first end wall.

10. The water collector assembly of claim 9, wherein the gutter is disposed generally parallel to the second guide wall.

11. The water collector assembly of claim 1, a chamber is defined between the first guide wall, the second guide wall, and a side wall extending between the first end wall and the second end wall.

12. The water collector assembly of claim 1, further comprising a perforated member that extends between the diffuser body and the center body.

* * * * *